United States Patent [19]

Wells

[11] Patent Number: 4,521,895

[45] Date of Patent: Jun. 4, 1985

[54] PULSE GENERATOR UNIT FOR FUEL PUMP REGISTER

[75] Inventor: Arthur J. Wells, Bloomfield, Conn.

[73] Assignee: Veeder Industries Inc., Hartford, Conn.

[21] Appl. No.: 445,049

[22] Filed: Nov. 29, 1982

[51] Int. Cl.3 ........................ B67D 5/22; G01F 15/06; G06M 1/12

[52] U.S. Cl. ........................................ 377/21; 377/89; 377/92

[58] Field of Search .............................. 377/21, 89, 92

[56] References Cited

U.S. PATENT DOCUMENTS 3,912,910 10/1975 Ochi ..................................... 377/92
3,959,674 5/1976 Kokinopoulos ....................... 377/89
4,200,785 4/1980 Evans et al. .......................... 377/21
4,296,411 10/1981 Romanelli et al. ................... 377/89

*Primary Examiner*—John S. Heyman
*Attorney, Agent, or Firm*—Prutzman, Kalb, Chilton & Alix

[57] ABSTRACT

A pulse generator unit for a fuel pump register employs a pulser shaft driven by a pulser drive gear rotatable with a lowest order counter wheel. A permanent magnetic means at the end of the pulser shaft rotates and actuates a reed switch to produce a pulse train having pulses indicative of rotation of the counter wheel. A ratchet clutch assembly is employed to selectively permit rotation of the pulser shaft in a counting direction and a resetting direction.

16 Claims, 5 Drawing Figures

PULSE GENERATOR UNIT FOR FUEL PUMP REGISTER

BACKGROUND OF THE INVENTION

The present invention relates generally to mechanical fuel pump registers of the type having resettable cost and volume counters for registering the cost and volume amounts of each fuel delivery. More particularly the present invention relates to a new and improved pulse generator unit for fuel pump registers for generating an electrical pulse train with an electrical pulse for each predetermined volume and/or cost amount of fuel delivered for remote registering of the volume and/or cost amount of each fuel delivery.

The pulse generator unit of the present invention is particularly adaptable for use with fuel pump registers of the type (shown and described in U.S. Pat. No. 2,814,444 of Harvey N. Bliss dated Nov. 25, 1967 and entitled "Register") having a supporting frame with upright side frames and two oppositely facing pairs of resettable cost and volume counters with respective banks of coaxial wheels mounted between the side frames for registering the cost and volume amounts of fuel delivered.

Pulse generator units have been disclosed for use in conjunction with fuel pump registers. For example, a pulse generator unit which is mounted on the side of a register and suitably connected to generate a pulse for each predetermined amount of fuel delivered for operating remote postpay equipment is shown and described in U.S. Pat. No. 3,878,377 of Peter P. Bruno, dated Apr. 15, 1975 and entitled "Fuel Fluid Delivery Control and Registration System". A pulse generator unit has also been described in U.S. Pat. No. 4,200,785 of Alfred C. Evans and Bruno S. Smilgys dated Apr. 30, 1980 and entitled "Pulse Generator Unit For Fuel Pump Register". The pulse generator unit shown and described in the latter patent was employed in connection with the volume totalizing assembly provided on a crossbar extending between side frames of the register to register the total volume of fuel delivered. A pulse generating device for operating an auxiliary counter and synchronizing the digital readout of an auxiliary counter with the readout of a fuel pump register is disclosed in U.S. Pat. No. 3,543,008 of William Kes, Arthur W. Kroll, and William L. Herron dated Nov. 24, 1970 and entitled "Pulse Generating Device".

The present invention is a new and improved pulse generator unit which is particularly adapted to be installed on an existing fuel pump register for actuation by a lowest order cost counter wheel. The pulse generator unit is adapted to communicate with circuitry for remote readout equipment. The pulse generator unit provides an electrical pulse train with an electrical pulse for each predetermined cost amount of delivered fuel and also provides means for preventing the generation of a spurious pulse due to a mechanical rebound of the register.

BRIEF SUMMARY OF THE INVENTION

The new and improved pulse generator unit which is adapted for use in a resettable fuel pump register for registering the cost and volume of each fuel delivery in a preferred form employs a mounting assembly which is secured to the register frame outwardly adjacent a lowest order counter wheel. The mounting assembly receives a pulser shaft which at an outer end has a rotary permanent magnet and at the opposite end has an input gear. The input gear is driven by a pulser drive gear rotatable with the lowest order counter wheel to rotate the pulser shaft. An intermediate ratchet clutch assembly has means for selectively permitting rotation of the pulser shaft in either a counting direction or a resetting direction. A magnetic pickup is operable by the rotary magnet to generate a pulse train with a pulse for each predetermined increment of rotation of the magnet, which pulse is also indicative of rotation of the counter wheel.

The ratchet clutch assembly comprises a clutch means permitting rotation of the pulser shaft in only a counting direction and a pawl disengageable from a ratchet gear for further permitting rotation of the pulser shaft in a resetting direction. The pawl is disengaged from the ratchet gear by the interaction of the end of the counter wheel shaft with the pawl when the shaft is shifted to condition the counter for resetting.

The rotary permanent magnet in a preferred form comprises a disc having alternating poles on its outer axial face. The magnetic pickup is a reed switch.

An object of the invention is to provide a new and improved pulse generator unit for conventional mechanical fuel registers which may be readily installed on existing registers in the field without otherwise modifying the register or the register enclosure.

An object of the invention is to provide a new and improved pulse generator unit which is rotatable with the lowest order cost wheel of the mechanical fuel pump register.

An object of the invention is to provide a new and improved pulse generator unit which may be actuated to provide both a remote digital counting readout and a resetting of the remote readout which functions are actuated by the counting and resetting systems of the mechanical fuel pump register.

Another object of the invention is to provide a new and improved pulse generator unit for a conventional mechanical fuel pump register for supplying an electrical pulse train with a pulse representing a predetermined volume and/or cost of fuel delivered for remote registration of each delivered fuel volume and/or cost amount.

Another object of the invention is to provide a new and improved pulse generator unit which produces an electrical pulse train for a remote counting readout, but prevents the generation of spurious pulses due to a mechanical rebound of the mechanical register upon the sudden termination of fuel delivery.

Other objects and advantages of the present invention will become apparent from the drawings and detailed description.

DETAILED DESCRIPTION

Figure 1:
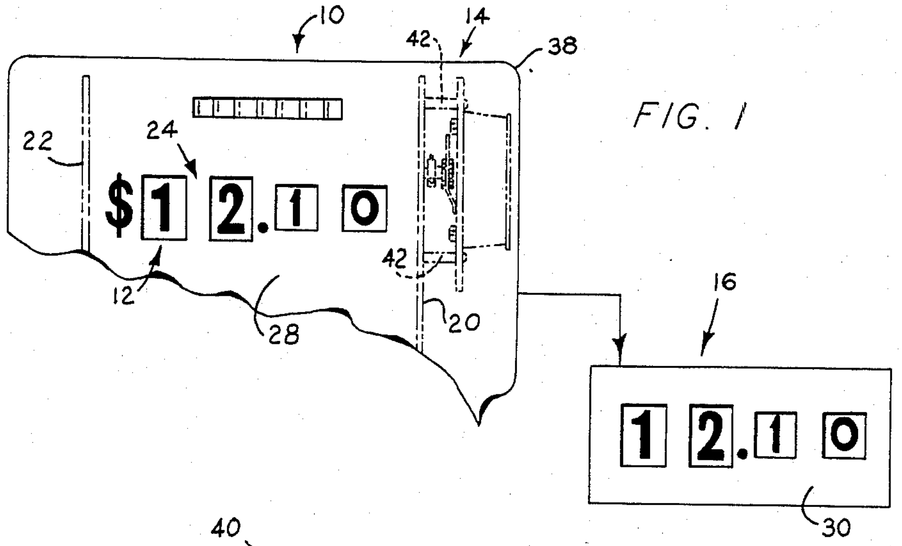
FIG. 1 is a front elevational view of a portion of a resettable fuel pump register incorporating the present invention, parts of which are shown in phantom, together with a schematic representation of a remote readout device.

Referring now to the drawings in detail wherein like reference numerals indicate like parts throughout the several figures, a fuel pump computer 10 having a resettable mechanical register 12 incorporating an embodiment of a pulse generator unit 14 of the present invention is of a conventional design excepting for the pulse generator unit 14 and a remote readout means 16 which is illustrated schematically. Resettable register 12 is generally of a type described in U.S. Pat. No. 2,814,444 and comprises a support frame with spaced upstanding said frames 20 and 22 and two pairs of oppositely facing resettable cost and volume counters (only an upper cost counter 24 being shown in the drawing) for registering the cost and volume amounts of fuel delivered. Each counter has a bank of coaxial resettable counter wheels (only a lowest order wheel 26 being shown in FIG. 2) of increasing order mounted on a counter shaft 18 with respective coaxial reset gears (not shown). In a conventional manner counter shaft 18 axially shifts to engage the reset gears with the counter wheels to condition the counter for counting.

A variator (not shown and which may be of a type such as described in U.S. Pat. No. 3,314,867 of Richard B. Hamlin dated Dec. 3, 1968 and entitled "Variator") is mounted directly below the register 12 in a conventional manner for establishing and posting the unit volume price of fuel. The variator has a vertical drive shaft (not shown) adapted to be driven by a fuel meter, and in a conventional manner, the variator is connected to the register 12 for driving the cost and volume counters for registering the volume amount of fuel delivered (e.g. in gallons) and the cost amount of fuel delivered in accordance with the volume amount delivered and unit volume price established by the variator assembly.

A dial face 28 is provided on the front and back faces of the register 12 (only the front dial face 28 being shown) to provide a mask for the register mechanism and suitable windows for reading the cost and volume counters and a bank of unit volume price wheels (not shown) of the variator.

With reference to FIG. 1, a pulse generator unit 14 illustrated in phantom is shown in a preferred position mounted to side frame 20 proximate the lowest order end of the cost shaft of cost counter 24. The shape, dimensions, and position of pulse generator unit 14 allow the unit to be accommodated within the conventional register enclosure 38.

Pulse generator unit 14 communicates with remote readout means 16 having an auxiliary readout device 30. Remote readout means 16 including readout device 30 may assume a number of forms of a type generally actuated by a pulse control circuit and employed to provide a remote readout of the cost and/or volumetric amounts of fuel delivered either as for accounting purposes or for conveniently displaying the cost and/or volume of the fuel dispensed to the driver of the vehicle being fueled. The pulse generator unit provided by the present invention may be employed in connection with either a cost counter or a volume counter of both. Because the description and principle of operation of the pulse generator unit 14 is substantially the same regardless of whether the corresponding counter is a cost or volume counter, the present invention will be described in connection with cost counter 24 having a lowest order counter wheel 26. For simplicity the exemplary readout device 30 is a single digital counter connected to provide a corresponding remote readout of the cost only.

Figure 2:
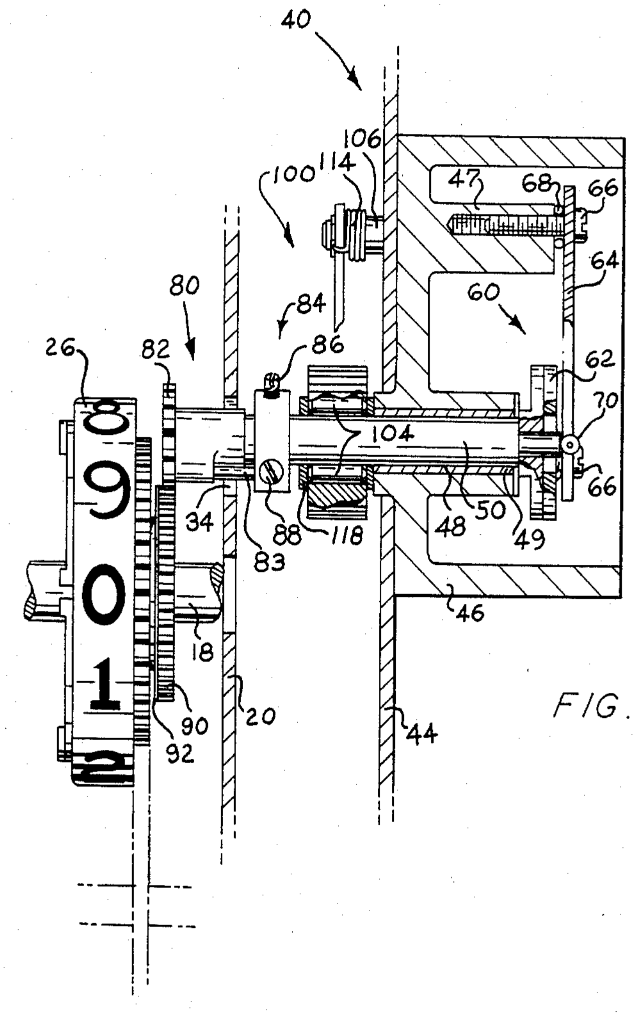
FIG. 2 is a side view of a pulse generator unit and a lowest order end of a counter of the resettable fuel pump register of FIG. 1, partly in section, illustrating a preferred embodiment of the invention.

With reference to FIG. 2, a mounting assembly shown generally as 40 is secured by a plurality of spacer brackets 42 (only one of which is illustrated) which project outwardly from the side of frame 20 adjacent the lowest order cost counter wheel 26. Mounting assembly 40 comprises a plate 44 secured to brackets 42 (shown in FIG. 1) and generally parallel to frame side 20. Plate 44 receives at its outer surface a substantially cylindrical explosion proof housing 46. Housing 46 is transversed by a central bore 48 having a bearing sleeve 49 which receives a rotatable pulser shaft 50.

In general terms, the pulse generator unit 14 operates by transferring a rotation of pulser shaft 50 which shaft rotation acts to provide a train of electrical output pulses as will be described in detail below. The train of pulses is indicative of a predetermined incremental rotation of the lowest order counter wheel 26 and hence indicative of the corresponding volume or cost amount of delivered fuel. The output of the pulse generator unit is generally provided by permanent magnetic means 60 positioned proximate the outer end of pulser shaft 50. Rotation of pulser shaft 50 is accomplished through an input gear means 80 mounted to pulser shaft 50 proximate the inner end thereof and adjacent the lowest order counter wheel 26. A ratchet clutch means 100, intermediate magnetic means 60, and input gear means 80 interacts with pulser shaft 50 to selectively permit pulser shaft rotation. With reference to FIG. 2, ratchet clutch means 100 is positioned between plate 44 and side frame 20. Input gear means 80 extends through an opening 34 of side frame 20 to a forward position adjacent the lowest order counter wheel 26.

Figure 3:
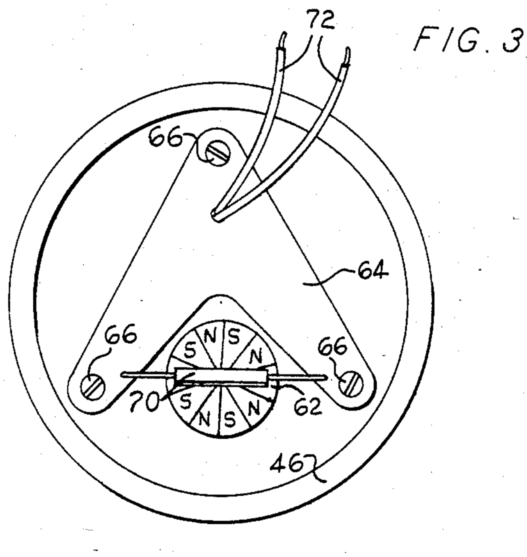
FIG. 3 is an end view of the pulse generator unit of FIG. 2 looking toward the left of FIG. 2, a portion being shown in schematic.

With reference to FIGS. 2 and 3, permanent magnetic means 60 comprises a rotary magnetized ceramic disc 62 mounted at the end of pulser shaft 50 and enclosed within housing 46. Disc 62 may be press fit to the end of pulser shaft 50. In a preferred form, disc 62 is permanently magnetized to form an annular arrangement of ten equiangularly spaced alternating North and South permanent magnetic poles, as illustrated schematically in FIG. 3.

A substantially V-shaped circuit board 64 is secured by means of three adjustment screws 66 threadably received in shoulders 47 of housing 46. Springs 68 are positioned between circuit board 64 and shoulders 47 coaxial with screws 66 to provide an adjustment means for accurately positioning the circuit board 64 as will be described below.

A magnetic sensor means in the form of a reed switch 80 extends between opposite sides of circuit board 64 to a position within the magnetic field of permanent magnetic means 60. Reed switch 70 is slightly offset from the outer face of disc 62 and in general alignment therewith. Reed switch 70 operates in a conventional manner to detect the alternately polarities of a magnetic field by exhibiting same through the opening and closing of a switch which is suitably connected to a control circuit. Reed switch 70 extends essentially horizontal and orthogonal to the longitudinal axis of pulser shaft 50. Adjustment screws 66 may be suitably adjusted so that the actuating portion of reed switch 70 is equidistant from the outer face of disc 62 to provide approximately equally spaced on and off signals to a pulse control circuit. A pair of leads 72 connect reed switch 70 to a pulse control circuit.

With reference to FIG. 2, input gear means 80 comprises an input gear 82 which is mounted to pulser shaft 50 to transfer rotational motion to the pulser shaft. Input gear 82 is positioned so that it is in drive engagement with a pulser drive gear 90. Pulser drive gear 90 is rotatable with the lowest order counter wheel 26 so that rotation of the lowest order counter wheel 26 produces corresponding rotation in pulser drive gear 90 which imparts rotation to pulser shaft 50 via input gear 82.

The longitudinal and radial position of input gear 82 relative to pulser drive gear 90 is important for optimum accuracy and mechanical efficiency of the pulse generator unit. A synchronizer unit 84 is preferably employed to obtain the optimum positioning of input gear 82. In order to mesh efficiently there should be on the order of 0.005 to 0.015 inches in play between the face of input gear 82 which is preferably of plastic material and the shroud 92 of the pulser drive gear 90 which is usually of dye cast form. Synchronizer unit 84 receives a set screw 86 which can be tightened to secure the longitudinal position relative to pulser shaft 50 after the correct longitudinal positioning of input gear 82 has been obtained. Proper radial adjustment of input gear 82 is obtained by a timing adjustment screw 88 which may be suitably adjusted to fix the radial position of an off-center shaft 83 fixed to input gear 82. The angular position of input gear 82 can thus be synchronized with the "0" count of the cost counter 24 to produce an accurate reference pulse of a pulse train generated by the pulse generator unit, the detailed operation of which will be described below.

By way of example, for a lowest order cost counter wheel 26 which employs an indicia bearing rim having 40 cost increments thereon (40-cent wheels), the pulser drive gear 90 preferably has 40 teeth and the input gear 82 has 10 teeth. It should be noted that in a conventional manner such a 40-cent cost wheel has four transfer members to transfer a count to the next order counter wheel. With further reference to FIG. 2, in a counter configuration wherein the increasing counts of the counter increments on the lowest order wheel 26 are moving from a lower to a higher position during the counting process, the rotation of the counter wheel 26 and hence the pulser drive gear 90 is in the counter-clockwise direction of FIG. 4. Therefore, during the counting process the rotation of input gear 82 and hence pulser shaft 50 will be in the clockwise direction of FIG. 4 (counter clockwise direction of FIG. 3). Because of the 1:4 gear ratio between input gear 82 and pulser drive gear 90, a complete revolution of the lowest order counter wheel 26 produces four revolutions of input gear 82. In other words, for each cent of rotation on counter wheel 26 pulser shaft 50 rotates a corresponding 1/10 revolution.

With reference to FIGS. 2 and 3, upon rotation of pulser shaft 50 magnetic disc 62 fixed to the end of pulser shaft 50 rotates relative to reed switch 70. Reed switch 70 is magnetically actuated to successively open and close according to each of the alternating magnetic field polarities of the ten poles of the magnetic disc 62. Reed switch 70 is adjusted and positioned so that the open and close switch phases are approximately equal. For each revolution of pulser shaft 50 and hence disc 62, reed switch 70 is magnetically opened and closed ten times whereby for each approximately 18° of rotation, substantially equidistantly spaced edges of a pulse train is produced in a circuit containing the reed switch 70 and controlling remote readout means 16. Therefore, in effect 20 substantially equally spaced edge signals are generated for each revolution of disc 62. Thus, for the example outlined above, each cent registered on the cost counter 24 results in the generation of a corresponding pulse transferred to the remote readout means 16. Thus, the remote cost counter 30 actuable by a series of pulses can be suitably connected in a circuit to be operable by the pulse generator unit 14 to accurately register the cost amount displayed by the corresponding cost counter 24.

Remote cost counter 30 is illustrated for registering the corresponding cost of the fuel delivered in one-cent increments so that the readout of counter 30 will be substantially in accord with cost counter 24. However, it should be appreciated that the readout of remote counter 30 will not continuously correspond precisely to the readout of the cost counter 24 because in the conventional mechanical register, the cost counter is driven in a gradual or analog fashion whereas the remote counter 30 is a pulse controlled digital readout.

Remote cost counter 30 may be any suitable pulse operated counter and may be conveniently provided with a bank of resettable single wheel electromagnetic counters of the type which are indexed or stepped at the end of each electrical operating pulse. Reference may be made to U.S. Pat. No. 3,543,008 relative to the synchronizing of the input pulse signals generated by a pulse generator unit with a control circuit to produce output pulses for indexing a remote readout counter.

Figure 4:
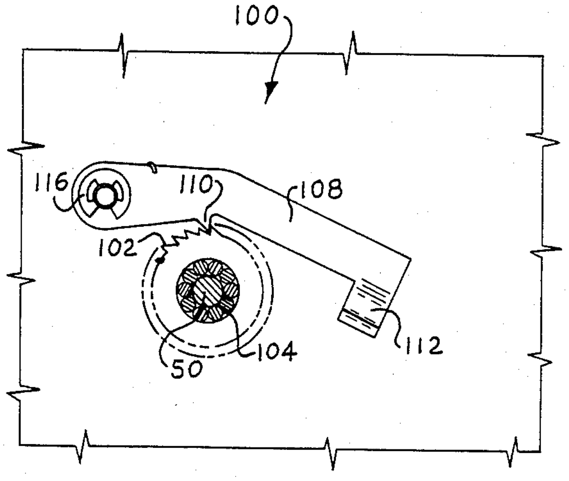
FIG. 4 is an interior view, partly in section, of the pulse generator unit of FIG. 2 looking toward the right end thereof.

Referring now to FIGS. 2 and 4, a ratchet clutch means 100 functions to provide for selective rotation of pulser shaft 50. A ratchet gear 102 is mounted to pulser shaft 50 intermediate permanent magnetic means 60 and input gear means 80. A one-way roller brake 104 is interiorly positioned between pulser shaft 50 and ratchet gear 102 so that pulser shaft 50 is permitted to axially rotate in one direction relative to ratchet gear 102 (the clockwise direction of FIG. 4), but not in the opposite direction. A lock ring 118 may be employed to secure ratchet gear 102 in place on pulser shaft 50.

One of the major problems inherent in employing a pulse generator unit in a mechanical fuel pump register to operate a remote counter is the generation of spurious pulses which are not reflective of the counting performed by the register or the amount of delivered fuel. For instance, in the normal operation of a fuel pump register it is common for a mechanical rebound to be transmitted throughout the mechanical counting system upon the sudden termination of fuel delivery. The rebound may result in the cost counter rebounding in a negative direction or a direction opposite to the counting direction. By permitting the rotation of pulser shaft 50 in only a counting direction during the counting condition, the generation of spurious pulses due to mechanical rebound is prevented, and consequently the generated pulses accurately reflect the actual volume and/or cost amount of fuel delivered.

A boss 106 extends inwardly from plate 44 to receive the pivot end of a pawl 108 and secure same with lock member 116. Pawl 108 has an intermediate booth 110 which during counting engages with ratchet gear 102 to prevent rotation of the ratchet gear 102 and hence to prevent via brake 104 counter-clockwise rotation of pulser shaft. It is noted that for the rotational directions previously described herein, in order to permit rotation of pulser shaft 50 in only the clockwise direction of FIG. 4 it is sufficient that ratchet gear 102 be prevented from rotating in the clockwise direction as viewed in FIG. 4. However, because the directions of rotation may be opposite to that previously described depending on the particular counter to which the pulse generator unit is coupled, a bi-directional ratchet gear may be employed. Such a bi-directional gear can be used regardless of the applicable directions of rotation. At the free end of pawl 108, an inclined downwardly projecting bearing surface 112 extends outwardly toward plate 44. Pawl 108 is further biased by a coil spring 114 which may mounted around boss 106 and attached at the top of pawl 108 to bias pawl 108 downwardly as viewed in FIG. 4 into engagement with the ratchet gear 102.

Figure 5:
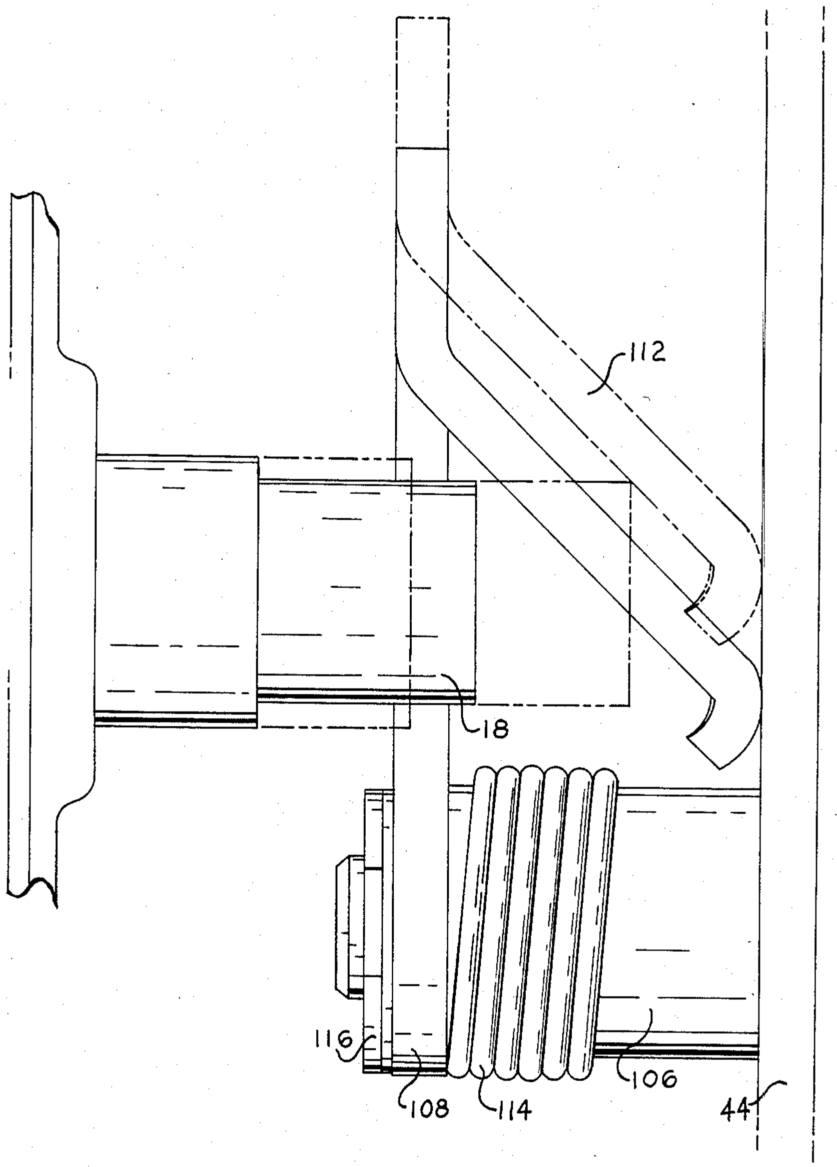
FIG. 5 is an enlarged side view, partly in phantom, illustrating the interaction between a portion of the pulse generator unit and a counter wheel shaft.

In the conventional fuel pump register, when the cost counter is conditioned for resetting, the counter wheel shaft is axially shifted outwardly as shown by the broken lines of FIG. 5. Upon the outward shifting of the counter wheel or reset shaft 18, the end of shaft 18 bears against the inclined bearing surface 112 forcing a consequent upward (counter-clockwise direction of FIG. 4) pivoting of pawl 108 so that pawl tooth 110 disengages ratchet gear 102 and ratchet gear 102 is now free to rotate.

For purposes of illustration and consistent with the above disclosure herein, the operation of the pulse generator unit is described for a counter having a counting condition in which counting wheel 26 rotates in a counter-clockwise direction as viewed in FIG. 4. During the register resetting mode, counter wheel 26 and hence pulser drive gear 90 rotates in a clockwise direction to drive input gear 82 in a counter-clockwise direction which rotation is translated to pulser shaft 50. Pulser shaft 50 and magnetic disc 62 are thus free to rotate in the resetting direction (the counter-clockwise direction of FIG. 4) since the one-way brake 104 interior of ratchet gear 102 is now ineffective to prevent counter-clockwise rotation of pulser shaft 50.

The remote readout device 30 may be reset either manually or upon receipt of signal from the register when the register is conditioned for resetting or by other suitable means. In most applications, the remote readout counter 30 will be in a shutoff mode during the resetting of the register, i.e., the readout device will not register pulses generated from the pulse generator unit (if pulses are generated). At the conclusion of resetting, i.e., at the "0" reference of the counter, the pulse reference position determined via the radial position of input gear 82 is preserved.

When the resetting of the counters of the register is completed, shaft 18 is shifted back to the normal counting position and the register is in condition for counting. In the absence of shaft 18 bearing against surface 112, the bias of spring 114 urges pawl 108 downwardly so that pawl tooth 110 re-engages ratchet gear 102. The one-way brake 104 interacting between pulser shaft 50 and ratchet gear 102 is now effective to permit rotation of pulser shaft 50 in only the counting direction or the clockwise direction of FIG. 4.

It can be seen that the present invention can be relatively easily installed within existing mechanical fuel pump registers and the operation of the pulse generator unit to produce pulses indicative of counting is essentially integrated with the mechanical counting system of the existing fuel pump register. In addition, the pulse generator unit incorporates a ratchet clutch means to prevent the generation of spurious pulses due to the mechanical rebound of the register.

As will be apparent to persons skilled in the art, various modifications, adaptions, and variations of the foregoing specific disclosure can be made without departing from the teachings of the present invention.

What is claimed is:

1. In a resettable fuel pump delivery register for registering the cost and volume of each fuel delivery and having a main frame with a pair of spaced generally parallel upright side frame members, at least one resettable counter with a bank of coaxial resettable counter wheels of increasing order mounted on a counter shaft with respective coaxial reset gears rotatable therewith, said counter shaft being axially shiftable to engage the reset gears with the counter to condition the counter for resetting, the counter being mounted on the main frame with the counter wheel bank mounted between the side frame members and with the counter shaft generally perpendicular to the side frame members for being read from one end of the register, and the lowest order counter wheel rotatable in a counting direction and an opposite resetting direction, the improvement wherein the resettable fuel pump delivery register further comprises a pulse generator unit comprising:

a mounting assembly mounted to the frame outwardly adjacent the lowest order counter wheel;

a pulser shaft rotatably received by said assembly;

an input gear means to rotatably couple said pulser shaft for rotation with said lowest order wheel;

a rotary permanent magnet mounted to said pulser shaft;

a ratchet clutch means to selectively restrict rotation of said pulser shaft to a counting direction or permit rotation of said pulser shaft in a resetting direction; and a magnetic sensor operable by the rotary permanent magnet for generating a pulse train with a pulse for each predetermined increment of rotation of said magnet.

2. The resettable fuel pump delivery register of claim 1 wherein said ratchet clutch means comprises a clutch means permitting rotation of said pulser shaft in only a counting direction determined by the direction of rotation of said counter wheel during the delivery of fuel.

3. The resettable fuel pump delivery register of claim 2 wherein said ratchet clutch means further comprises a pawl disengageable from a ratchet gear for selectively permitting rotation of said pulser shaft in a resetting direction.

4. The resettable fuel pump delivery register of claim 3 wherein said pawl further comprises an inclined bearing surface slidably engageable by the counter shaft when said shaft is shifted to condition the counter for resetting.

5. The resettable fuel pump delivery register of claim 4 wherein when said counter is conditioned for resetting, said pawl is forced to disengage from said ratchet gear.

6. The resettable fuel pump delivery register of claim 1 wherein said rotary permanent magnet comprises a disc having alternating magnetic poles at its outer face.

7. The resettable fuel pump delivery register of claim 6 wherein said rotary permanent magnet further comprises ten equiangular spaced alternating magnetic poles.

8. The resettable fuel pump delivery register of claim 1 wherein the magnetic sensor is a reed switch.

9. The resettable fuel pump delivery register of claim 1 further comprising adjustment means for setting the reference position of the input gear.

10. The resettable fuel pump delivery register of claim 3 wherein said pawl comprises an intermediate tooth and a biasing means to bias the pawl tooth into engagement with said ratchet gear.

11. The resettable fuel pump delivery register of claim 10 wherein when said pawl tooth engages said ratchet gear, said pulser shaft is permitted to rotate in only one the counting direction.

12. The resettable fuel pump delivery register of claim 2 wherein said clutch means comprises a one-way brake engageable with said pulser shaft.

13. The resettable fuel pump delivery register of claim 12 wherein said mounting assembly comprises:

a plurality of spacers extending from a side frame member;

a mounting plate secured to said spacers; and a cylindrical housing received by said plate and enclosing said rotary permanent magnet and said magnetic sensor.

14. In a resettable fuel pump delivery register for registering the cost and volume of each fuel delivery and having a main frame with a pair of spaced generally parallel upright side frame members, at least one resettable counter with a bank of coaxial resettable counter wheels of increasing order mounted on a counter shaft with respective coaxial reset gears rotatable therewith, said counter shaft being axially shiftable to engage the reset gears with the counter wheels to condition the counter for resetting, the counter being mounted on the main frame with the counter wheel bank mounted between the side frame members and with the counter shaft generally perpendicular to the side frame members for being read from one end of the register, the improvement wherein the resettable fuel pump delivery register further comprises a pulse generator unit comprising:

a mounting assembly mounted to the frame adjacent a lowest order wheel;

a pulser shaft received by said assembly and rotatably driven by said lowest order counter wheel, said pulser shaft mounting a rotary permanent magnet;

a magnetic sensor operable by the rotary magnet for generating a pulse train with a pulse corresponding to a predetermined increment of rotation of said counter; and a ratchet clutch assembly having clutch means to permit rotation of said pulser shaft in only a counting direction when said register is in a counting condition and ratchet means to permit rotation of said pulser shaft in a resetting direction when said register is in a resetting condition.

15. The resettable fuel pump delivery register of claim 14 wherein said ratchet clutch assembly comprises a ratchet gear mounted on said pulser shaft and having a one-way roller brake therebetween.

16. The resettable fuel pump delivery register of claim 15 wherein said ratchet clutch assembly further comprises a pawl having an intermediate tooth biased to engage said ratchet gear when the register is in the counting condition and an inclined end portion slidably engageable by the end of the counter wheel shaft when the register is in the resetting condition to disengage said tooth from said ratchet gear.

* * * * *